United States Patent [19]

Hirose

[11] Patent Number: 5,425,515
[45] Date of Patent: Jun. 20, 1995

[54] AIRCRAFT

[76] Inventor: Tokuzo Hirose, 13-13, Higashiyama-cho, Ashiya-shi, Hyogo, Japan

[21] Appl. No.: 205,200

[22] Filed: Mar. 3, 1994

[30] Foreign Application Priority Data

Sep. 17, 1993 [JP] Japan .................. 5-232021

[51] Int. Cl.⁶ .................. B64B 1/20; B64B 1/22
[52] U.S. Cl. .......................... 244/5; 244/25; 244/45 R; D12/335
[58] Field of Search .............. 244/5, 25, 26, 45 R, 244/125; D12/335

[56] References Cited

U.S. PATENT DOCUMENTS

| D. 113,019 | 1/1939 | Silverstein | D12/335 |
|---|---|---|---|
| D. 211,612 | 7/1908 | De Asis | D12/335 |
| D. 231,490 | 4/1974 | Cernuda | 244/199 |
| 1,853,653 | 4/1932 | Babula | 244/5 |
| 1,874,468 | 8/1932 | Douglas | 244/5 |
| 2,382,817 | 8/1945 | Reiss | 244/5 |
| 2,678,783 | 5/1954 | Myers | 244/7 B |
| 3,032,298 | 5/1962 | Callahan | 244/5 |
| 3,443,776 | 5/1969 | Moore | 244/5 |

Primary Examiner—Galen L. Barefoot
Attorney, Agent, or Firm—Iandiorio & Teska

[57] ABSTRACT

The object of the invention is to provide an aircraft which is capable of being enhanced in speed and preventing a crash even when a propeller does not operate to provide thrust to the aircraft. A wing which is an envelope made of a flexible material is comprised on an upper side of a aircraft body, and is filled with a gas with a specific gravity less than that of air. Moreover, the aircraft body is provided with a propeller.

1 Claim, 8 Drawing Sheets

AIRCRAFT

BACKGROUND OF THE INVENTION

1. Field of the Invention

The present invention relates to a floating and flying aircraft in the air.

2. Description of the Related Art

Figure 15:
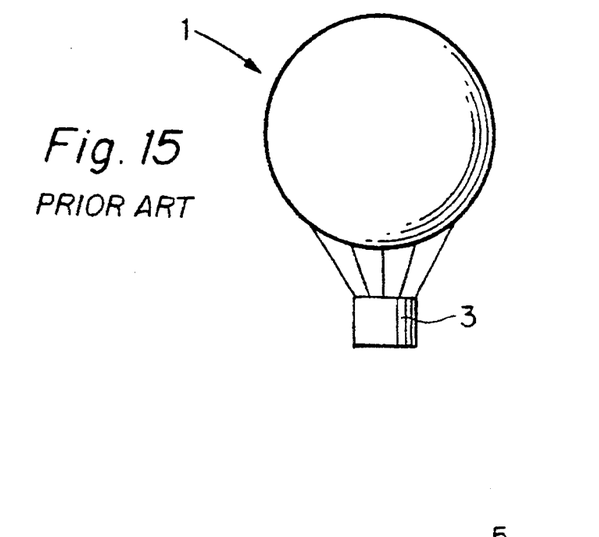
FIG. 15 is a perspective view of a balloon 1 of a further prior art.

A typical prior art is a balloon 1 as shown in FIG. 15. The balloon 1 comprises a spherical envelope filled with a gas with a specific gravity less than that of air and a carriage basket 3 suspended from the envelope for carrying a crew.

Figure 16:
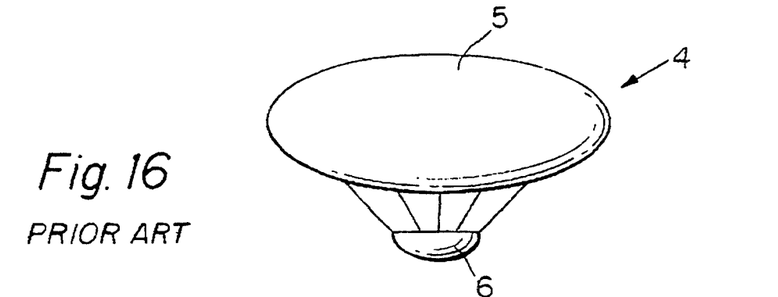
FIG. 16 is a perspective view of a balloon 4 of a further prior art.

A further prior art shown in FIG. 16 discloses a balloon 4 which comprises a spheroidal envelope filled with a gas with a specific gravity less than that of air, and a carriage basket hung from the envelope for carrying a crew.

In these prior arts shown in FIGS. 15 and 16, since the envelopes 2, 5 are spherical or spheroidal, flying speed of these balloons are not able to be enhanced. Further, in these prior arts, there has not been considered to make use of wind to increase buoyancy or aerodynamic lift for the balloons.

Figure 17:
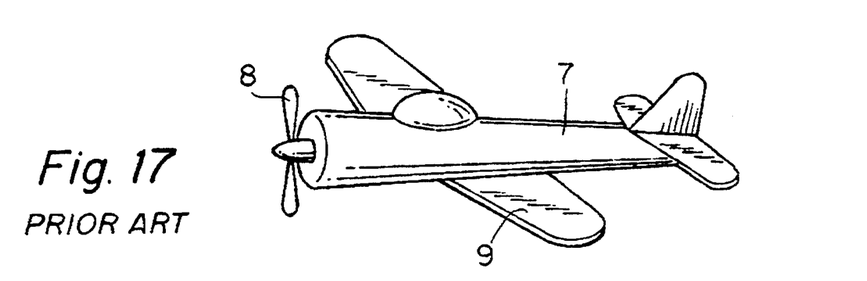
FIG. 17 is a perspective view of an aircraft of a further prior art.

FIG. 17 is a perspective view of a further prior art. The prior art relates to an airplane, which obtains thrust by driving a propeller 8 rotationally, and aerodynamic lift by means of a wing 9.

In this kind of airplane shown in FIG. 17, if any trouble should occur with the propeller 8, the aerodynamic lift might not be generated by means of the wing 9, which causes a severe accident of the airplane crash.

SUMMARY OF THE INVENTION

It is an object of the invention to provide an aircraft which is capable of enhancing a speed and capable of preventing a crash even when a propeller provides no thrust for the aircraft.

The invention is characterized in that the aircraft has a wing being filled with a gas with a specific gravity less than that of air.

Further, the invention is characterized in that the wing is provided on an upperside of a body.

The invention is characterized in that the body or the wing is provided with thrust generating means.

Furthermore, the invention is characterized in that the thrust generating means includes a propeller and an internal combustion engine for driving the propeller.

The invention is characterized in that the thrust generating means is a jet engine.

The invention is characterized in that the gas is a natural gas, helium, or the like.

Further, the invention is characterized in that the wing is an envelope made of a flexible material. Moreover, the invention is characterized in that the aircraft has a sliding foot for sliding on or in water.

The invention is characterized in that a floating body is provided on an upperside of the body and filled with a gas with a specific gravity less than that of air.

An aircraft according to the invention is characterized in that the body has a cavity extending along a longitudinal direction of the body filled with a gas with a specific gravity less than that of air.

According to the invention, the aircraft has a wing filled with a gas with a specific gravity less than that of the air, such as helium, argon, or a natural gas used as a fuel, whereby the wing is subjected to buoyancy. Additionally, when a wind blows, or when thrust is generated by a propeller or jet engine, aerodynamic lift is generated to lead the aircraft to ascend to a higher.

Furthermore, according to the invention, it is possible for the aircraft to fly at a low altitude such as at a region near the ground or the sea surface, which results in saving of fuel consumed by thrust generating means.

According to the invention, as described above, since the aircraft is subjected to buoyancy by filling the wing with a gas with a specific gravity less than that of air, the aircraft itself is capable of floating in the air just like a conventional balloon. Further, by employing such a wing, when a wind blows, or when thrust is generated by the thrust generating means, a aerodynamic lift is generated to enable the aircraft to fly. Thus, the flying speed thereof is able to be enhanced, and besides a crash accident can be prevented even if the thrust generating means is put into failure.

Further, according to the invention, the wing is filled with a natural gas, whereby the natural gas can be transported by the aircraft from a production center thereof. A natural gas having a $CH_4$, content of at least 80% may be employed and it is possible to contain a liquefied gas in part. The transport of the natural gas by the aircraft is safe in view of a fire because the fire would not affect the ground.

BRIEF DESCRIPTION OF THE DRAWINGS

Other and further objects, features, and advantage of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
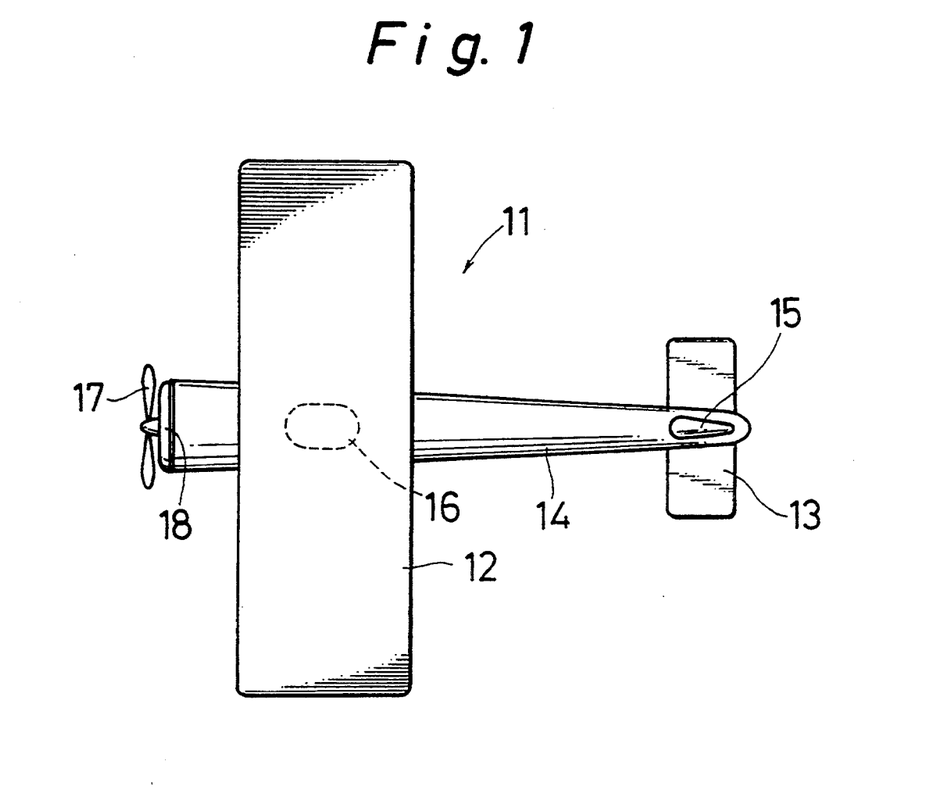
FIG. 1 is a plan view of an aircraft 11 of an embodiment of the invention.

FIG. 1 is a plan view of an aircraft 11 of an embodiment of the invention. In FIG. 1, a body 14 is provided with a primary wing 12, an empennage 13 and a vertical tail plane 15. The body 14 is also provided with a space for a crew. The aircraft body 14 is provided in a front portion thereof with a propeller 17 for generating thrust, and an internal combustion engine 18 for driving the propeller 17.

Figure 2:
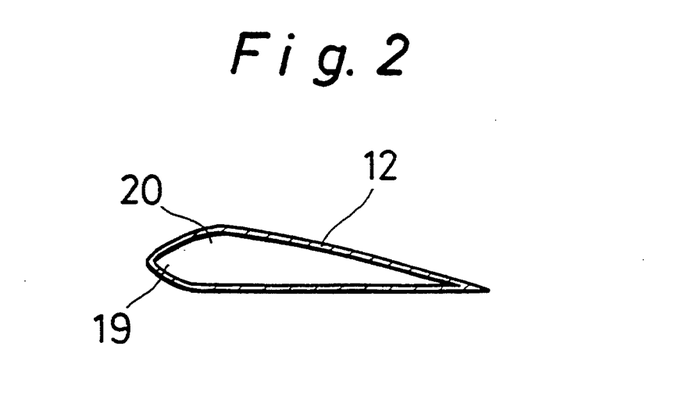
FIG. 2 is a sectional view of a main wing 12 taken along a plane vertical to an axis thereof.

FIG. 2 is a sectional view of a main wing 12 taken along a plane vertical to an axis thereof. The primary wing 12 is an envelope made of a flexible material, and has a shape that a front portion 19 thereof (left side in FIG. 1 or FIG. 2) rises. The main wing 12 has a cavity filled with a gas with a specific gravity less than that of air. Such a gas may be a rare gas like helium, argon or the like, and a natural gas having a $CH_4$ content of at least 80% may be employed and it is possible to contain a liquefied gas in part. The natural gas may also contain ethane, propane, butane or the like instead of methane. The main wing 12 is disposed on an upper side of the body 14. The empennage 13 and the vertical tail plane 15 have the same constitution as that of the primary wing 12. The flying direction of the aircraft is determined by the vertical tail plane 15.

Figure 3:
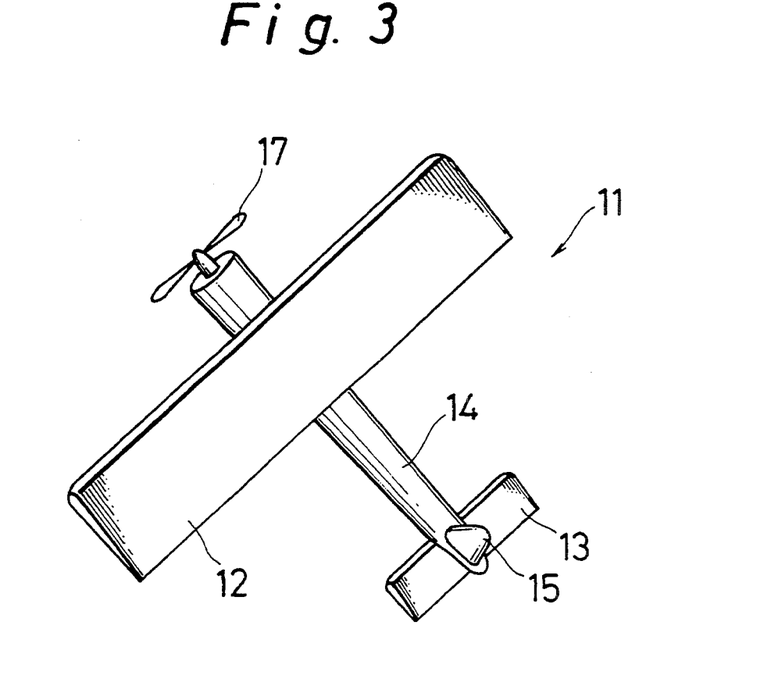
FIG. 3 is a perspective view of the aircraft 11.
Figure 4:
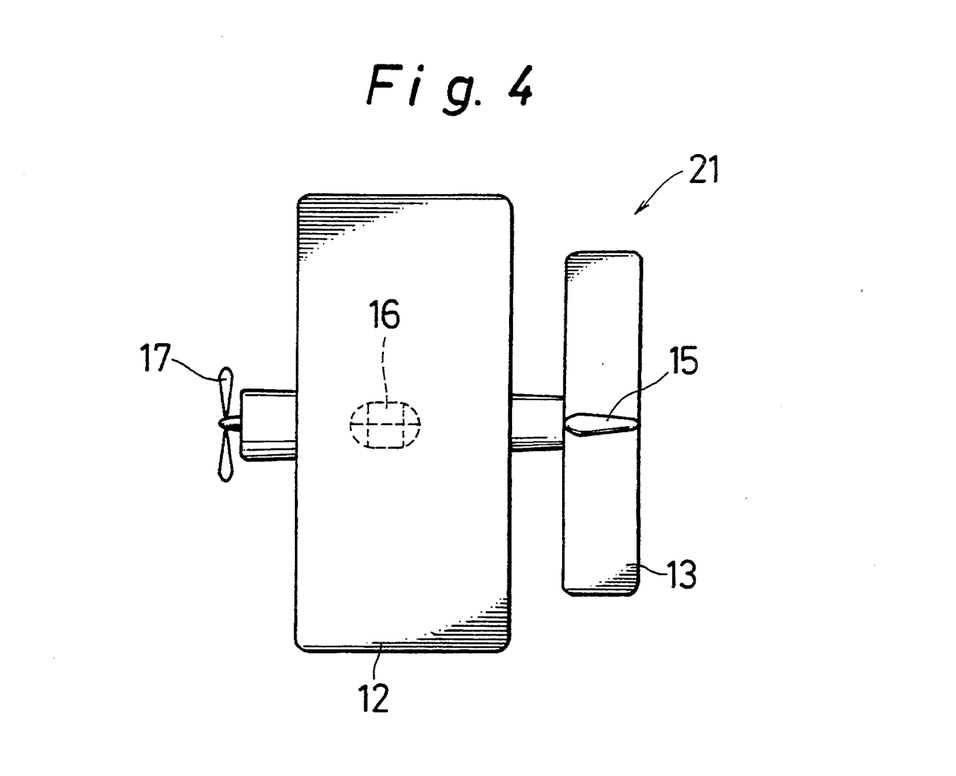
FIG. 4 is a plan view of an aircraft 21 of a further embodiment of the invention.
Figure 5:
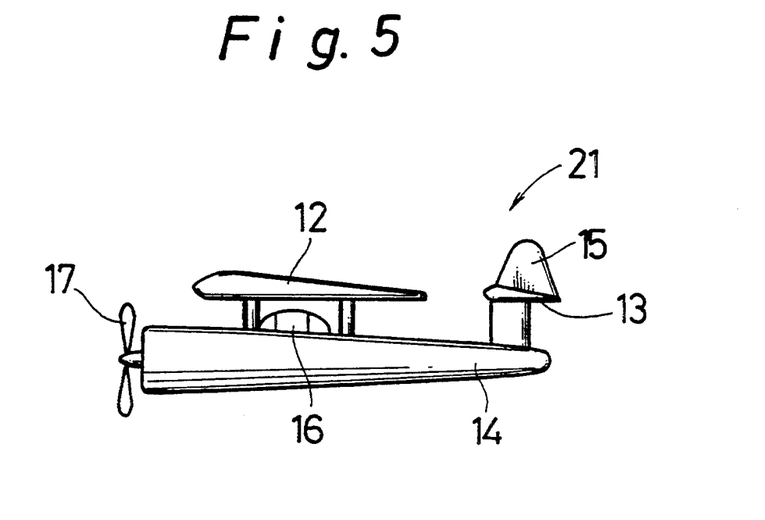
FIG. 5 is a side view of the aircraft 21 shown in FIG. 4.

FIG. 3 is a perspective view of the aircraft 11 of the embodiment shown in FIG. 1 and FIG. 2. Since the aircraft 11 is capable of floating in the air even when the propeller 17 and the internal combustion engine should fail to function, a crash accident is able to be prevented even in case that thrust can not be obtained. Further, when a wind blows, an aerodynamic lift exerted on the aircraft will be generated, which enables the aircraft to ascend to a high altitude, FIG. 4 is a plan view of an aircraft 21 of a further embodiment of the invention and FIG. 5 a side elevation view thereof. This embodiment is similar to the embodiment described above. Each corresponding element is identified by the same reference numeral. In this embodiment a wing 12 is fixed above a body 14 so that a space is provided therebetween.

Figure 6:
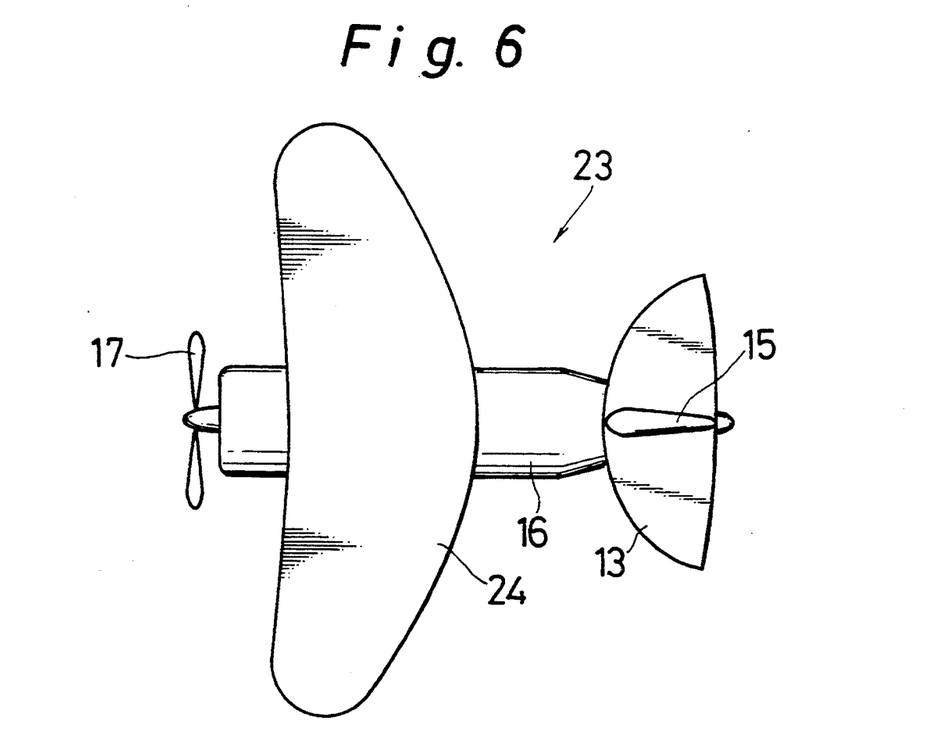
FIG. 6 is a plan view of an aircraft 23 of a further embodiment of the invention.

FIG. 6 is a plan view of an aircraft 23 of a further embodiment of the invention. The shape of a main wing 24 is different from that of the main wing 12. The plane shape of the main wing 12 is almost rectangular. But of the main wing 24 in the embodiment shown in FIG. 6 is almost triangular.

Figure 7:
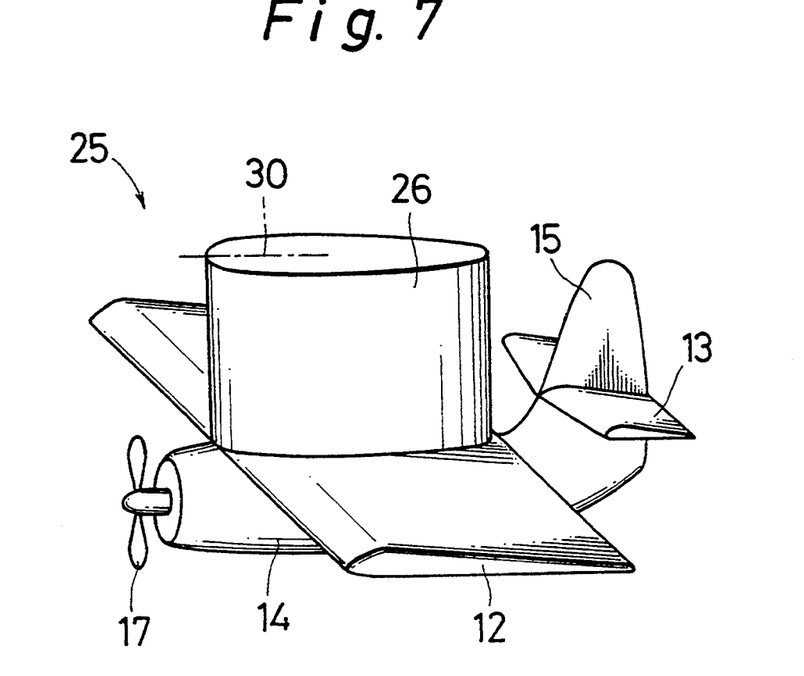
FIG. 7 is a perspective view of an aircraft 25 of a further embodiment of the invention.

FIG. 7 is a perspective view of an aircraft 25 of other embodiment of the invention. The aircraft 25 is similar to the aircraft shown in FIGS. 1 to 3. Each corresponding element is identified by the same reference numeral. The primary wing is provided further with a vertical wing 26 thereon, whereby the aerodynamic lift is further increased and the linearly forwarding performance is enhanced.

Figure 8:
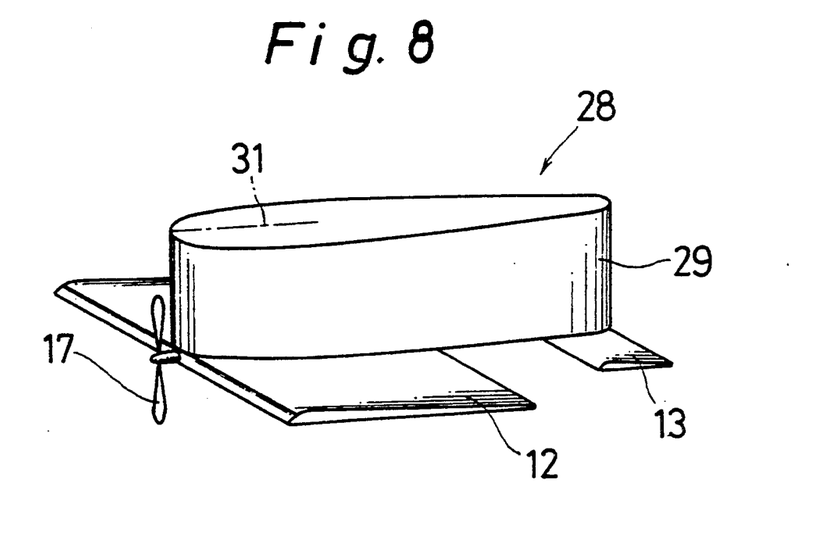
FIG. 8 is a perspective view of an aircraft 28 of a further embodiment of the invention.

FIG. 8 is a perspective view of a further embodiment of the invention. In FIG. 8, an aircraft is provided with a vertically formed wing 29 ranging from the main wing 12 to the empennage 13. By this configuration, the buoyancy is also further increased by virtue of this configuration and the linearly forwarding performance is further enhanced.

The vertical wing 26 in FIG. 7 is plane-symmetric about a symmetry plane 30 and projects outward from the main wing 12. The vertical wing 29 in FIG. 8 is also plane-symmetric about a symmetry plane 31 and projects outward form the main wing 12. These vertical wings 26 and 29 are envelopes made of a flexible material, and are filled with a gas with a specific gravity less than that of air.

In the embodiments shown in FIGS. 1 to 8, the body 14 may be also an envelope made of the flexible material and filled with the gas. Further, the body 14 may be made of a rigid material like a metal or light weight synthetic resin.

Figure 9:
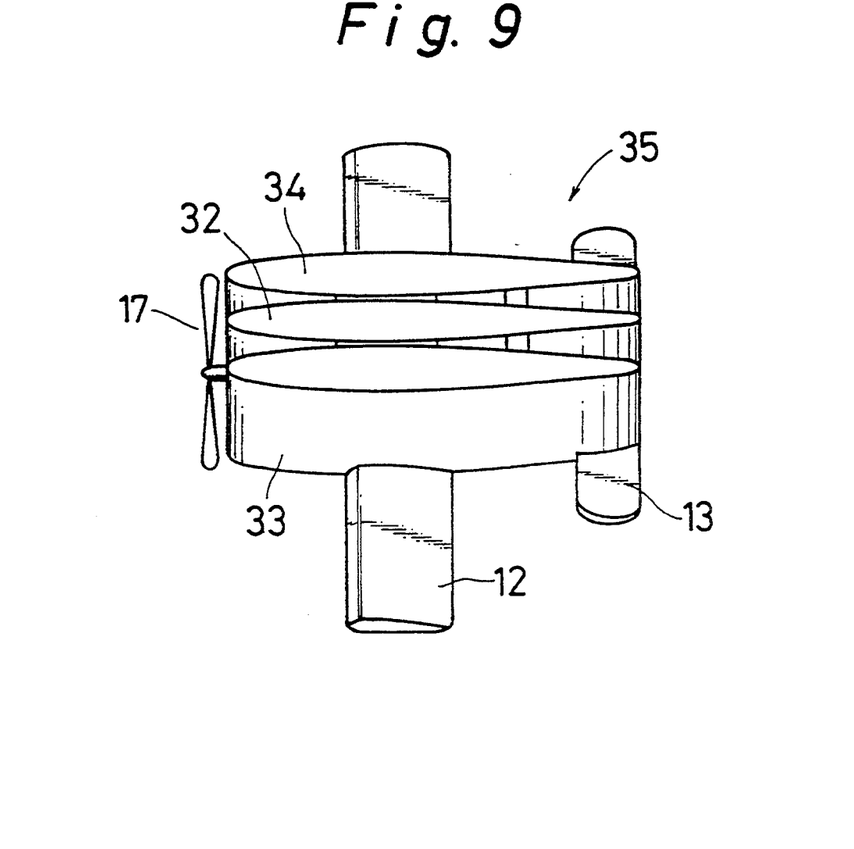
FIG. 9 is a perspective view of an aircraft 35 of a further embodiment of the invention.
Figure 10:
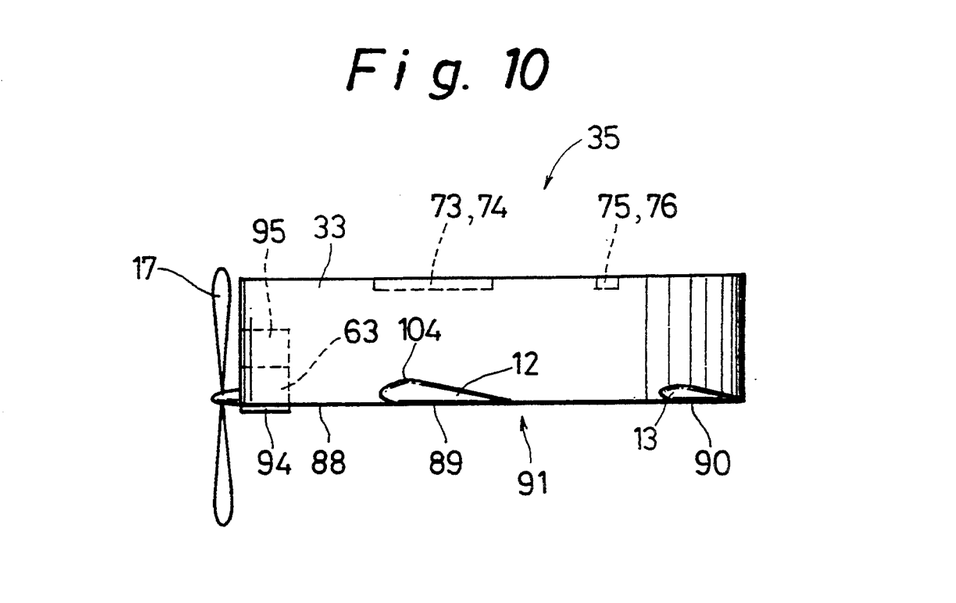
FIG. 10 is a longitudinal sectional view of the aircraft 35 shown in FIG. 9.
Figure 11:
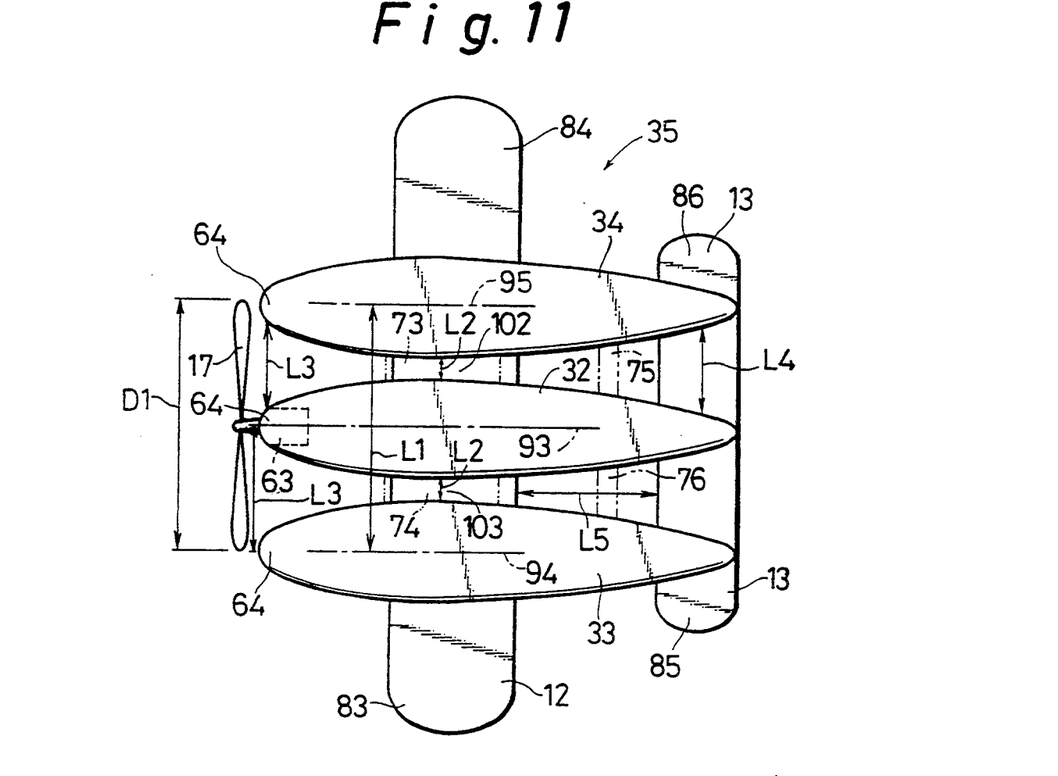
FIG. 11 is a plan view of the aircraft 35 shown in FIG.

FIG. 9 is a perspective view of an aircraft 35 of a further embodiment according to the invention. FIG. 10 is a side view of the aircraft 35 shown in FIG. 9. FIG. 11 is a plan view of the aircraft 35 shown in FIG. 9. In this embodiment, a center vertical wing 32 and side vertical wings 33, 34 are provided, which extend from a back end of the empennage 13 beyond a front end of the main wing 12. The main wing 12 and the empennage 13 are arranged on a lower side of the center vertical wing 32 and the side vertical wings 33, 34 and respective flat bottom faces 88 to 90 of the main wing 12, the empennage 13, the center vertical wing 32 and both side wings 33, 34 are included in a one and the same plane 91. Further a rear end of the main wing 12 is at a distance $L_5$ from a front end of the empennage 13. The side vertical wings 33, 34 are arranged to be symmetric about a perpendicular plane including an axis 93 of the center vertical wing 32 and to be parallel with each other.

The empennage 13 is formed to be smaller than the main wing 12 and to be almost similar in figure thereto. The respective upper portions of the side vertical wings 33, 34 are connected to the upper portion of the center vertical wing 32 via hollow connection members 74, 73, respectively, almost above the main wing 12. Further, the respective upper portions of the side vertical wings 33, 34 are also connected to the upper portion of the center vertical wing 32 via hollow connection members 76, 75 respectively, in a part of a region between the main wing 12 and the empennage 13. The connection members 73 to 76 prevent the vertical wings from separating due to a high air flow rate and therefore that enables to further enhance the flying speed. Further, respective rear ends of the vertical wings 32 to 34 correspond to a rear end of the empennage 13, which contributes to mutual enhancement of strength of the vertical wings 32 to 34 and the empennage 13. The main wing 12, the empennage 13 and the vertical wings 32 to 34 form a airtight single space, respectively. Top and bottom faces of the respective vertical wings 32 to 34 are formed to be flat and a horizontal section of the respective vertical wings 32 to 34 is identical in a perpendicular direction thereof. The respective vertical wings 32 to 34 are formed to have a streamline shape. Front ends 64 of the horizontal sections of the vertical side wings 32 to 34 are rounded. Further, the respective vertical wings 32 to 34 are formed to have a streamline shape that a width of the horizontal section gradually increases from a front portion of the horizontal section toward a portion thereof above the main wing 12 and gradually decreases toward a portion thereof above the empennage 13. Thus, distances $L_2$ between peripheral side surfaces in the positions where the width of the horizontal section of the vertical wings 32 to 34 is maximum is smaller than distances $L_3$ therebetween in the front portions of the vertical wings 32 to 34 and distances $L_4$ therebetween in the rear portions of the vertical wings 32 to 34. Additionally, the portions of the respective vertical wings 32, 33, 34 where the center vertical wing 32 is the closest to each of the side vertical wings 33, 34 correspond to a most rising portion 104 of the main wing 12. Further, an outer diameter $D_1$ of the propeller 17 is almost equal to a distance $L_1$ between axes 94, 95 of the side vertical wing 33, 34, respectively. Therefore, a rate of air flow which is taken in by the propeller 17 is maximum at portions 102, 103 between the center vertical wing 32 and the side vertical wing 34 and between the center vertical wing 32 and the side vertical wing 33, respectively, which contributes to the generation of high aerodynamic lift. A rotation axis of the propeller 17 is arranged in the horizontal plane 91 and in a vertical section of the center vertical wing 32 including the axis 93.

The respective vertical wings 32 to 34 are formed to be an envelope made of a lightweight and flexible material. Further, the vertical wings 32 to 34 may be filled with a gas with a specific gravity less than that of air such as helium, argon and methane, in order to further enhance buoyancy.

The aircraft 35 is driven by means of an internal combustion engine 63. The internal combustion engine 63 and a crew cabin 95 are arranged in an enclosed space in a front portion of the center vertical wing 32, and a lower portion 94 of the internal combustion engine 63 little projects from the bottom face 88 of the central vertical wing 32.

Side end portions 85, 86 of the empennage 13 are projected beyond the side vertical wings 33, 34 respectively. Similarly, side end portions 83. 84 of the main wing 12 are projected beyond the side vertical wings 33, 34, respectively.

Figure 12:
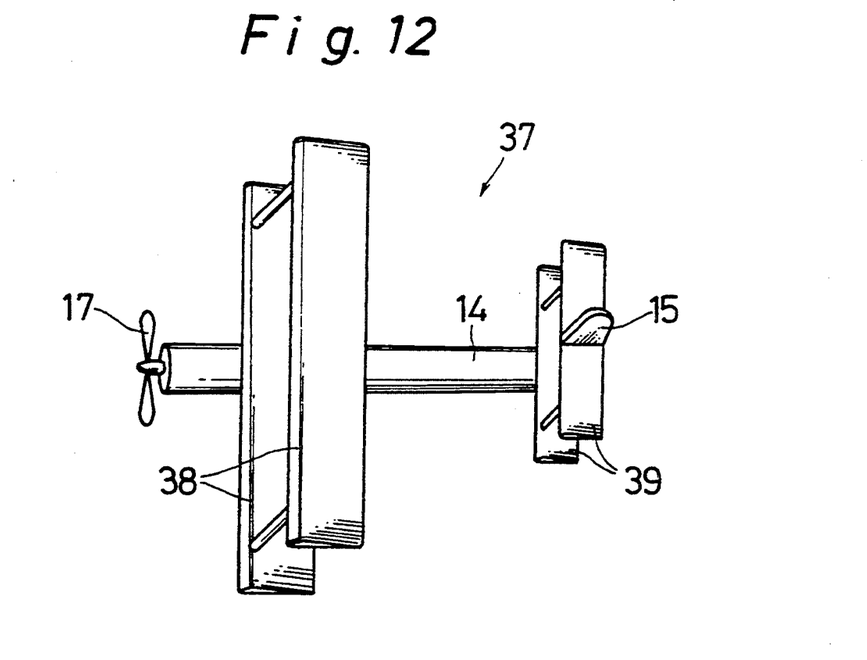
FIG. 12 is a perspective view of an aircraft 37 of a further embodiment of the invention.

A further embodiment is an aircraft 37 shown in FIG. 12. The aircraft 27 comprises a body 14 provided with a main wing 38 which is a biplane. Further, the body 14 is provided with an empennage which is also a biplane. This configuration will enable the buoyancy and the aerodynamic lift to be further increased.

The propeller 17 and the internal combustion engine 18 may be replaced by a jet engine. The vertical wings 32, 33 and 34 of FIG. 9, which can be also expressed as a floating body, are plane-symmetric about the vertical symmetry plane extending in a longitudinal direction of the aircraft body.

The aircraft body 14 may be provided therebeneath with a sliding foot having a wing-shaped vertical section for sliding on or in water. This kind of sliding foot enables the aircraft 14 to slide lightly in the vicinity of water surface by making use of a high buoyancy.

Figure 13:
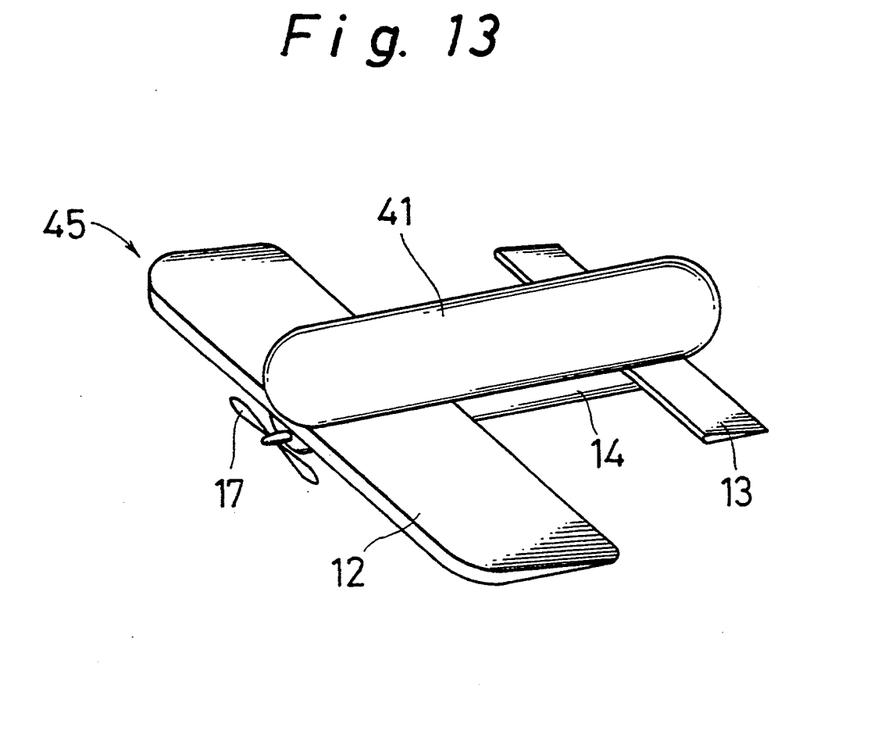
FIG. 13 is a perspective view showing an aircraft 45 of a further embodiment of the invention.

FIG. 13 is a perspective view of a further embodiment of the invention. This embodiment is substantially similar to that shown in FIG. 9. However, the embodiment has a remarkable feature that a floating body 41 fixed on an upperside of the body 14 has a shape of straight cylinder with two spherical end portions in a longitudinal direction. The floating body 41 is filled with a gas with a specific gravity less than that of air. The configuration of the other elements of the embodiment is the same as that of the above-mentioned embodiments.

Figure 14:
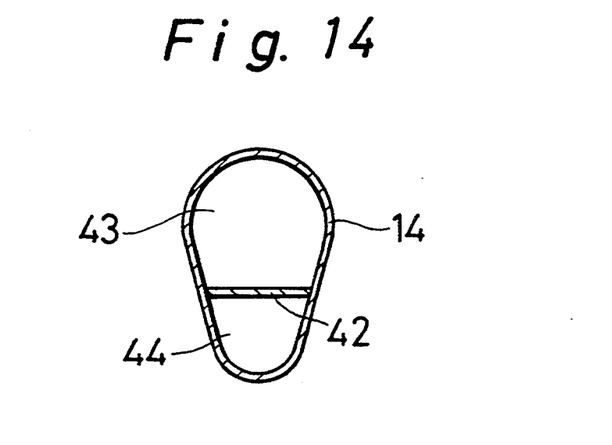
FIG. 14 is a sectional view taken along a plane vertical to an axis of the body 14 of a further embodiment of the invention.

FIG. 14 is a sectional view taken along a plane vertical to an axis of the body 14 of a further embodiment of the invention. In this embodiment, the body 14 in the foregoing embodiments is divided into two elements, namely, upper and lower compartments 43, 44, by a partition member 42. The upper compartment 43 is filled with a gas with a specific gravity less than that of air. The upper compartment 43 is formed to range over the entire length of the body 14 along a longitudinal direction thereof. The configuration of the other elements of the embodiment is the same as that of the foregoing embodiments. By this kind of configuration as shown in FIG. 14, the buoyancy and aerodynamic lift of the aircraft are able to be increased.

In the embodiment shown in FIG. 13, a plurality of the floating bodies 41, for example, three floating bodies as shown in FIG. 9 may be arranged in parallel with each other to fix to the body 14.

This invention is able to be embodied in a helicopter or the like by employing a hollow rotor blade filled with a gas with a specific gravity less than that of air.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An aircraft comprising:
   opposing side vertical wings and a center vertical wing therebetween;
   a horizontally extending empennage traverse to and interconnected with said side vertical wings and said center vertical wing at a rear portion thereof; said empennage being connected on a bottom portion of said side and center vertical wings;
   a horizontally extending main wing transverse to and interconnected with said side vertical wings and said center vertical wing, said main wing spaced from said empennage;
   said main wing also being connected on a bottom portion of said side and center vertical wings;
   said side vertical wings and said center vertical wing being hollow and filled with a gas lighter than air to enhance buoyancy;
   said side vertical wings parallel to each other and symmetrical about said center vertical wing;
   hollow connection members interconnecting upper portions of said side vertical wings to an upper portion of said center vertical wing above said main wing;
   hollow connection members interconnecting upper portions of said side vertical wings to an upper portion of said center vertical wing between said main wing and said empennage;
   said opposing side vertical wings and said center vertical wing having flat top and bottom surfaces;
   said opposing side vertical wings and said center vertical wing having a rounded front face;
   said opposing side vertical wings and said center vertical wing increasing in width from the front face thereof to a central portion proximate said main wing and then decreasing in width to a rear portion thereof proximate said empennage;
   a crew cabin space located in a front portion of said center vertical wing; and
   a propeller affixed to a bottom front portion of said center vertical wing, an outer diameter of said propeller spanning a distance between said side vertical wings for maximizing air flow between said side vertical wings and said center vertical wing; and
   an internal combustion engine for driving said propeller, said internal combustion engine located in a front portion of said center vertical wing.

* * * * *